United States Patent [19]

Eklund et al.

[11] 3,774,280

[45] Nov. 27, 1973

[54] METHOD OF FABRICATING HOLLOW BALLS FOR USE IN ROLLING CONTACT BEARING APPLICATIONS

[75] Inventors: Phillip R. Eklund, Dayton; Gabe L. Campbell, Greenville, both of Ohio

[73] Assignee: The United States of America as represented by the Secretary of the Air Force by said Campbell

[22] Filed: July 18, 1972

[21] Appl. No.: 273,004

[52] U.S. Cl............................................ 29/148.4 B
[51] Int. Cl......................... B21h 1/14, B23p 11/00
[58] Field of Search ................ 29/148.4 B, 148.4 R, 29/148.4 D; 308/88

[56] References Cited
UNITED STATES PATENTS 3,470,720  10/1969  Eklund et al.................... 29/148.4 B
3,536,368  10/1970  Eklund et al......................... 308/88

*Primary Examiner*—Thomas H. Eager
*Attorney*—Harry A. Herbert, Jr. et al.

[57] ABSTRACT

Means for fabricating a seamless hollow ball by initially spin-forging a metal tube into a non-spherical structure that is hollow and closed except for a pair of equatorial or diametral openings, and thereafter simultaneously and progressively shaping the initially formed structure into a spherical hollow ball and eliminating the openings by a controlled plastic deformation resulting from pressure or forge-welding the structure by the application thereto of a series of hot forging operations.

10 Claims, 12 Drawing Figures

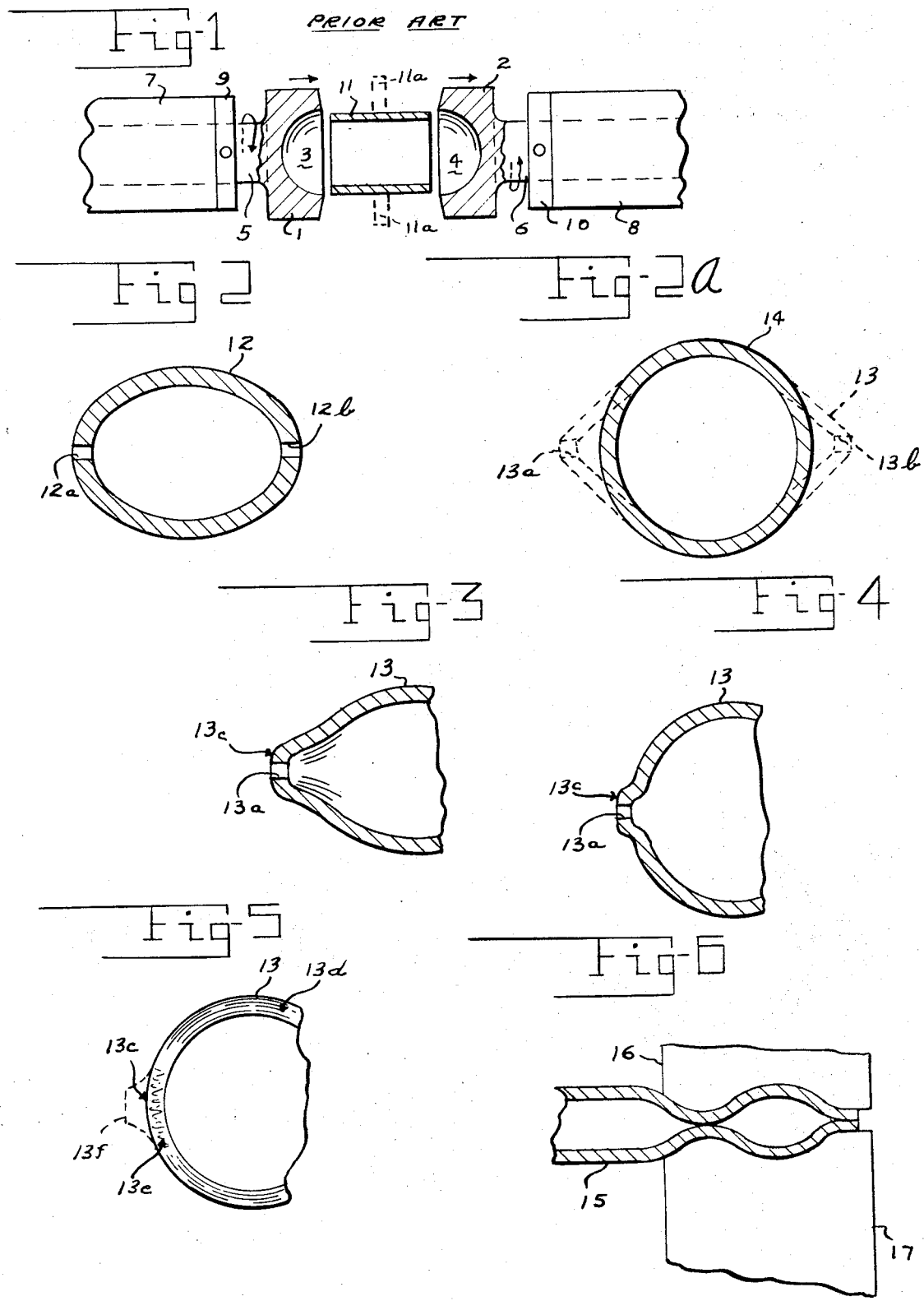

METHOD OF FABRICATING HOLLOW BALLS FOR USE IN ROLLING CONTACT BEARING APPLICATIONS

BACKGROUND OF THE INVENTION

This invention relates generally to the fabrication of hollow balls for use in rolling contact bearings and, in particular, to the production of a seamless-type of hollow ball.

The use of hollow balls as the load-carrying components in rolling contact bearing applications has been previously proven to be feasible as the result of the laboratory tests thereof. In general, such hollow balls have been constructed from the uniting together along a common seam of a pair of identical or substantially identical and hollow hemispherical half portions or shells. One means used for this purpose has been that known as a butt joint type of diffusion bonding. Of course, it has been found that the strength of the joint or welded area between the two united shells has naturally been the major factor in the limiting load, or stress to which the hollow ball constructed in this manner may be subjected either by dynamic or endurance loading. In fact, static tensile tests run on hollow ball specimens having two halves joined together along a common bonding line have shown that the strength of the welded or bonded area is only approximately one-half that of the basic material of the ball itself. Naturally, therefore, failures in the hollow ball of this type have occurred most often in the joint area.

Previous study and investigation by the present applicants in the hollow ball field resulted in the development of improved and more reliable fabricating means for constructing hollow balls. One such means is described and claimed in applicants' U.S. Pat. No. 3,536,368, in which two hemispherical shells are joined together by a brazed tongue-and-groove arrangement that is considered to constitute an obvious improvement over standard butt joint-welding methods, such as diffusion bonding, which unfortunately suffers from the considerable disadvantage of leaving a significant upset or bulge of welded material at the joint area. Obviously, although this bulge of material may be machined off the external surface of the ball, there still remains the excess welded material inside the ball structure. The U.S. Pat. No. 3,536,368 system, of course, eliminates entirely any significant upset or bulge of material at the joint or bonding line.

In a second technique, another improvement in fabricating hollow ball structures, described and claimed, again, by the present applicants in their U.S. Pat. No. 3,470,720, a precut section of metal tubing is placed in stationary position between a pair of rotatable and longitudinally shiftable dies. By simultaneous rotating in opposite directions and being shifted inwardly on the opposite ends of the tubing, the latter is thereby spin forged into a spherically shaped hollow ball which, however, is closed except for a pair of equatorial or end openings remaining therein. In the aforementioned U.S. Pat. No. 3,470,720, these openings are closed by a pair of plug members of the same material as the remainder of the ball structure. However, although a more homogeneous and uniform structure has been developed thereby, as compared with other hollow ball-fabricating methods; nevertheless, a jointed relation exists between the circumference of each plug member and the respective opening in which it is inserted, which jointed relation creates discontinuities in the microstructure of the ball that will tend to weaken the ball structure and/or form stress raisers therealong that could contribute to a reduced load/life capability. Therefore, to eliminate such microstructure discontinuities, as well as other disadvantages inherent in previously developed methods, the hollow ball-fabrication method of the present invention was developed, which method comprises a unique combination that utilizes and improves the spin orging technique of the aforementioned U.S. Pat. No. 3,470,720, in a new and novel, and yet simplified manner forging be further set forth hereinafter in the following summary and detailed description.

SUMMARY OF THE INVENTION

This invention consists briefly in initially spin forging a section of a cylindrical metal tube into a hollow ball configuration by placing the tube in a stationary position between a pair of die members having complementary internal cavities for receiving the opposite ends of the tube thereagainst. The die members are simultaneously rotatable in opposite directions and are shiftable inwardly towards each other in direct alignment with the axis of the tube to thereby deform and shape the tube by initially spin forging into a non-spherical hollow ball structure that is closed except for a pair of diametral or end openings.

After having been initially deformed into a substantially closed and non-spherical hollow ball by the aforementioned initial spin forging step, the initially formed structure may thereafter be pressure or forge-welded into the final spherical, hollow ball shape and the openings thereof, eliminated by the unique application thereto of a series of hot forging operations. The said operations may, in accordance with the unique teachings of the present invention, be accomplished by first placing the initially formed ball structure between a second pair of die members that incorporate internal die cavities suitably configured with raised surface portions to thereby ensure the application of a direct and concentrated pressure on opposite sides of the hollow ball at, and adjacent to the end openings thereof. The die members may then simultaneously apply inward pressure against the said opposite sides of the ball structure by any suitable, well-known means.

In concert with the above-outlined application of die pressure against the opposite sides of the initially formed hollow ball, localized heat may be initially and continuously applied to the material of each area of the ball structure that encompasses the said end openings, which application of localized heat provides for, and positively directs the pressure or forge-welding of the opposite sides of the hollow ball structure by the previously noted inward pressure being applied by the opposing dies. More specifically, the above-described pressure or forge-welding uniquely directs and causes a controlled plastic deformation or material flow to occur, which plastic deformation is, as inferred, controlled by the concentrated action of the die members to thereby provide both for the final shaping of the initially formed hollow ball into a spherical configuration and the elimination of the openings by the directed plastic flow of material thereinto.

Other objects and advantages of the invention will become readily apparent from the following disclosure, taken in connection with the accompanying drawings, in which:

BRIEF DESCRIPTION OF THE DRAWINGS

FIG. 1 is a somewhat schematic, sectional and partly broken-away view, showing a prior art apparatus that may be used to provide for the initial spin-forging step incorporated in, and uniquely combined with the overall new and improved hollow ball-fabrication technique of the present invention;

FIGS. 2 and 2a depict sectional and somewhat schematic views respectively illustrating an oval or elliptical hollow ball-preform, and a conical or football-shaped hollow ball-preform and finished circular hollow ball structure into which a deformable metal tubing section may be initially fabricated by the use of the spin-forging apparatus of FIG. 1, or one similar thereto;

FIGS. 3, 4 and 5 are partly broken-away, schematic and sectional views, respectively representing progressive steps involved in the successive application of a series of hot forging operations that may be applied to one or the other of the initially produced hollow ball-preforms of FIGS. 2 and 2a;

FIGS. 6 and 7 respectively depict in partly schematic, sectional and broken-away form the preliminary steps involved in an alternate, hot pinch-forming technique for producing the initial shape or preform of a hollow ball by means different from the spin-forging technique of the apparatus of FIG. 1;

DESCRIPTION OF THE PREFERRED EMBODIMENT

Figure 7:
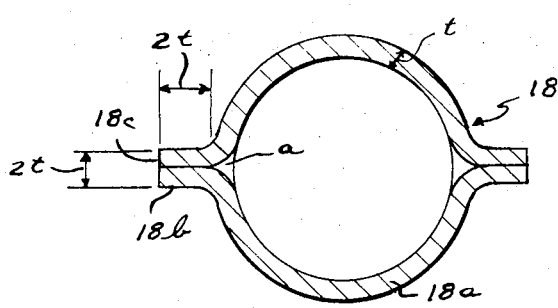

Referring generally to the drawings and, in particular, to FIG. 1 thereof, the apparatus shown may be used to spin forge a precut, short length of a deformable and cylindrically shaped, hollow metal tube, indicated at 11. This apparatus was previously disclosed and claimed by the present applicants in the aforementioned U.S. Pat. No. 3,470,720 and is directly reproduced therefrom. It consists principally of a pair of opposed die members 1 and 2 having inwardly facing cavities 3 and 4 of hemispherical shape, a shaft for each die member, as indicated at 5 and 6, and a pair of supporting and bearing members 7 and 8 for respectively carrying the shafts 5 and 6. Stop collars 9 and 10 are fixed on the shafts 5 and 6 to limit the separation between the die members 1 and 2 during their retraction to permit the positioning therebetween of the previously noted short length of precut tube 11. The tube 11 may then be placed in position between the die members 1 and 2 and the latter then returned to their inner positions to thereby bring the cavities 3 and 4 thereof into a contacting or capturing position relative to the opposite ends of the tube 11. Mounting means 11a may be used to hold the tube 11 in stationary position. Thereafter, as was previously explained in the aforementioned U.S. Pat. No. 3,470,720, the tube 11 may then be spin forged into a hollow spherical or ball-shaped member, if desired, by simultaneously rotating the die members 1 and 2 in opposite directions, and advancing the same in a longitudinal direction in contact with, and relative to the opposite ends of the tube 11. For this purpose, the members 7 and 8 may incorporate any well-known conventional means for providing the essential opposite rotation or spinning to the shafts 5 and 6 simultaneously with their concerted advancement inwardly towards each other. Of course, upon bringing the inner cavities 3 and 4 completely together, a hollow ball structure of a spherical configuration is formed. Also, the tube-mounting means 11a may be made movable so that it can be withdrawn to an out-of-the way position just prior to the movement of the die members 1 and 2 completely together.

In the above-described initial spin-forging fabrication of a section of a metal tube, as at 11, into a hollow ball-preform by the use of the prior art apparatus of FIG. 1, a spherically shaped hollow ball is constructed that is of a substantially closed configuration. However, this ball structure actually incorporates a pair of equatorial, end or diametral openings. As was explained hereinbefore in the solution offered in the aforementioned U.S. Pat. No. 3,470,720, plug members of the same material as the ball structure were inserted and sealed in these openings. Although this technique offers an improvement, the previously noted disadvantageous microstructure discontinuity still exists with the use of such plug members. In the instant invention, a further improved technique is employed to eliminate such end openings and still retain microstructure integrity. Again, the apparatus of FIG. 1 is used in the manner previously described to initially spin forge a deformable, cylindrical and stationarily held, short length of a metal tube, as indicated at 11 in the aforesaid FIG. 1. In accordance with the novel teaching of the present invention and forming one key feature thereof, it is desirable and even required that the initially formed hollow ball structure not necessarily be spherical in configuration. Instead, it is preferable that the initial hollow ball-preform to which the metal tubing 11 is actually to be spin forged should be of a non-spherical shape, such as the oval or elliptical preform 12 of FIG. 2, or the conical or football-shaped preform 13 in FIG. 2a. The latter figure also includes a depiction of the finished circular or spherical hollow ball configuration at 14. To produce the oval, elliptical, conical or football-shaped preforms, as at 12 and 13, by the initial spin forging step, the die cavities 3 and 4 (FIG. 1) may be easily and appropriately modified from their present hemispherical curvature to the particular shape that is desired to be produced by the previously explained simultaneous inward advancement and opposite rotation of the die members 1 and 2.

Whether the oval or elliptical preform 12 of FIG. 2, or the conical or football-shaped preform 13 of FIG. 2a is to be initially formed by spin-forging step, the inherent nature of the operation results in the previously noted pair of equatorial, diametral or end openings remaining in the selected preform. The elimination of these openings, seen respectively at 12a and 12b in FIG. 2 and at 13a and 13b in FIG. 2a, for example, forms a key feature of the present invention, which actually consists, in the preferred embodiment thereof, of fabricating a seamless hollow ball by uniquely combining the initial spin forging step previously described hereinbefore to produce one or the other preforms of FIGS. 2 and 2a, with a series of hot forging operations, operative on the initially spin-forged preform 12 or 13, to produce the final spherically shaped and seamless hollow ball by the specific means to be described in detail hereinbelow.

The previously noted spin, forging step may be accomplished while the section of the tube 11 is either cold or heated, which depends, of course, on the deformability of the particular metal to be used. Before setting forth details of the series of hot forging operations to be applied to the preforms 12 and 13 (FIGS. 2 and 2a) to eliminate the end openings inherently formed therein during the initial spin forging thereof, an alternate means, different from spin-forging and known as "pinch-forming" or swaging may be used to initially produce a hollow ball-preform or preliminary hollow ball shape, as is indicated, for example, in FIG. 6. In the latter figure, again it is seen that a precut section of a short hollow, metal tube, as at 15, may be placed between a pair of opposed pinch-forming or swaging die members, at 16 and 17, which die members 16 and 17 may be simultaneously advanced inwardly towards each other and in transverse relation to the axis of the tube 11 by any well-known operating means. Unlike the stationary tube 11 of FIG. 1, the tube 15 is made rotatable by any conventional or standard rotatable means. It is noted that neither the means for moving the die members 16 and 17 inwardly towards each other and the tube axis, or the means for rotating the tube 15 is shown, since the details thereof are unimportant to, and do not fall within the scope of the present invention.

By rotating the tube 15 (FIG. 6), which may also be heated as desired, between the pair of die members 16 and 17, as the latter are advanced radially inward towards the tube axis, that portion of the tube 15 between, and being acted upon by the die members is then plastically deformed to thereby form a hollow ball-preform or forging of the nominal shape seen at 18 in FIG. 7. Of course, the actual preform or forging 18 is produced by being cut off or severed from the remainder of the tubing 15. However, due to the inherent nature of the above-described initial forging process, a small internal cavity, as seen at a in the aforementioned FIG. 7, remains in the hollow ball-forging 18. Also, of course, an external boss area, at 18b, is formed on the main hollow ball-body portion 18a. At this point, the body portion 18a is circular or spherical in configuration and the elimination of the internal cavity a by the unique means, to be hereinafter described in specific connection with FIGS. 8a, 8b and 8c, constitutes the crux of the present invention.

Figure 8B:
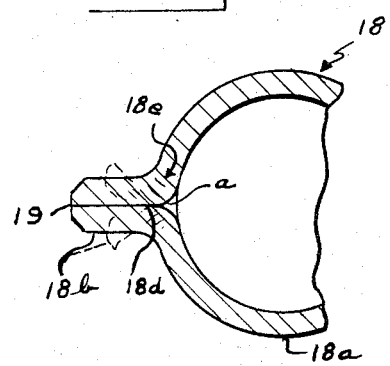
FIGS. 8a, 8b and 8c respectively depict progressive steps in utilizing suitably shaped die and/or anvil members for eliminating by pressure or forge-welding both end openings and an internal cavity found respectively in the preforms of FIGS. 2 and 2a, and FIG. 7, through means of a controlled plastic deformation.
Figure 8A:
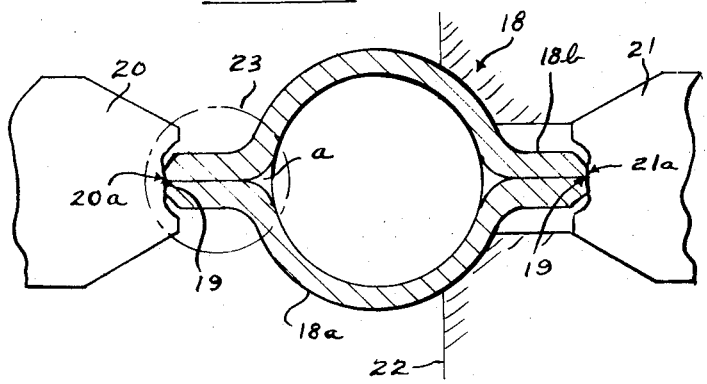

With particular reference to FIG. 8a, and in accordance with the new and improved teachings of the present invention, the hollow ball-extension or boss area 18b may be further machined shaped to the particular configuration shown, so that the squared-off or straight outermost edge thereof, seen at 18c in FIG. 7, which was initially formed when the hollow ball-forging 18 was severed from the tubing 15, may now incorporate a further outwardly extending projecting and reduced size boss portion, indicated at 19 in FIG. 8b, for example, for a particular purpose to be set forth hereinbelow. After its further shaping, the hollow ball-preform or forging 18 is then positioned with the opposite further projecting boss portions 19 thereof held in rigid contacting relation between a pair of die and/or anvil members, indicated at 20 and 21. In one such arrangement, the member 20 may represent an anvil member and the member 21 may represent a die member by which the elimination of the internal cavity a may be effected through means of pressure or forge-welding. Alternatively, the member 20 may be the die member and the member 21 the anvil member. As a still further alternative, both elements 20 and 21 may both constitute die members, or a supporting ball cavity-member 22 may be used. Whichever form is utilized, pressure is applied, for example, by the die member 21 upon the anvil member 20, after localized heat has been applied to the boss area, as indicated by the reference numeral at 23, for example.

Because of the previously applied, further shaping of the outer edge of the boss area 18b to a reduced-size, further outwardly extending projecting boss portion 19, which portion 19 directly contacts a matching, raised surface portion of similarly reduced-size, as depicted respectively at 20a and 21a on the internal cavity of each of the die/anvil members 20 and 21, a more directed and concentrated pressure or forge-welding is thereby applied against the oppositely disposed side portions of the boss area 19 to thus uniquely provide a controlled plastic deformation that causes metal in the boss area to flow inwardly towards, and completely fill the internal cavity a. In this regard, the precise amount of plastic deformation, as well as the external boss proportion may be determined experimentally. In connection with the external boss proportion, and as depicted in FIG. 7, if t represents the thickness of the wall of the hollow ball-forging 18, then both the length and diameter of the boss area 18b should not exceed a maximum equal to 2t, as is clearly indicated in the said FIG. 7.

Figure 8C:
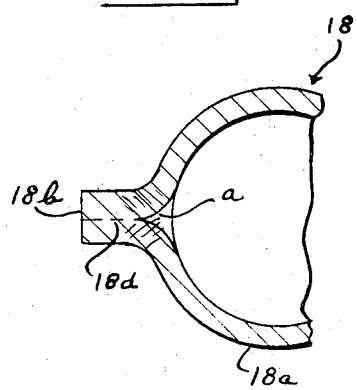

The region of the aforementioned plastic deformation is indicated generally at 18e in the aforementioned FIG. 8b, which figure schematically depicts the approximate direction of material flow that is operative both to fill the void of the internal cavity a and to also eliminate or substantially eliminate the equatorial seam formed during the initial pinch-forming operation, as is indicated at 18d. This all but complete elimination of the seam 18d is shown depicted in dashed lines in FIG. 8c. FIGS. 8b and 8c naturally illustrate progressive steps in the reshaping of the hollow ball-forging 18 into its final spherical or circular form, as is illustrated for example at 13 in FIG. 5 or at 14 in FIG. 2a. Any excess material or residual projection that remains after the plastic deformation process has been substantially or entirely completed, as is indicated at 18b in either FIG. 8b or 8c may, of course, be removed by the conventional processing thereof, such as rough grinding, finish grinding, lapping, and also including the proper heat treatment thereof.

The same pressure or forge-welding technique may be applied to the initially spin-forged, hollow ball-preforms 12 and 13 of FIGS. 2 and 2a to accomplish the previously referred to series of hot forging steps. For this purpose, each of the aforementioned preforms, as for example, the conical or football-shaped preform 13, may be easily positioned between a pair of anvil or die members, identical or similar to those indicated at 20 and 21 in FIG. 8a, for example, with the raised surface portions 20a and 21a thereof being simply modified, if required, to conform with, and accommodate the specific size and shape of the outwardly projecting end portions of the said conical or football-shaped preform 13, one of which outwardly projecting end portions being indicated generally at 13c in FIG. 3, for example. Said outwardly projecting end portion 13c, which is considered to be equivalent to the boss area 18b of the inventive form of FIG. 7, for example, is, again, gradually re-shaped by the aforementioned pressure or forge-welding technique, as in the previously discussed case of FIG. 8a, through the application of both localized heat and pressure by the action of the anvil or die members, as at 20 and 21, to the boss area 13c. Again, the controlled plastic deformation resulting therefrom not only gradually reshapes the hollow ball-preform, as at 13, to the desired circular or spherical configuration, but it also causes metal to flow into the previously described equatorial, end or diametral openings 13a and 13b of the conical or football-shaped, hollow ball-preform 13. Progressive steps in this series of operations are depicted respectively in FIGS. 3, 4 and 5. The inherent nature of the above-described processing of the initially spin-forged, hollow ball-preform, as at 12 or 13, will generally produce a grain flow that is parallel to the surface of the ball, as is indicated generally and schematically at 13d, while at the boss area or closure ends 13c, a heterogeneous microstructure, as depicted schematically at 13e, will be the result. As in the case of the pinch-formed or swaged technique of FIGS. 6 and 7, excess material at the boss area, as seen at 13f in FIG. 5 may be easily machined, followed by finish grinding, and lapping the remaining hollow ball structure, which processing naturally includes an appropriate heat treatment.

Figure 9:
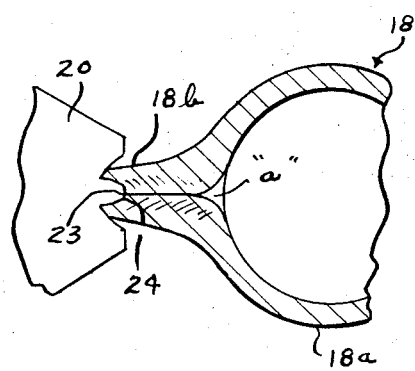
FIG. 9 illustrates, in schematic and partly broken-away form, a modified die member for applying a more intensified, localized plastic deformation to eliminate the internal cavity initially found in a hollow preform.

Referring particular to FIG. 9, a still further modified form of the invention is illustrated in which a more intensified and directed, localized plastic deformation is accomplished on, and within the boss area 18b of the initially produced, hollow ball-preform or forging 18 by means of specially configuring the surface of the internal cavity of the die or anvil member 20, for example, with a more sharply and outwardly extending raised surface and concentrated die or anvil-cavity-portion, indicated at 23, which portion 23 mates with and engages a recess, indicated at 24, which may be machined or otherwise formed in the outer surface portion of the boss area 18b of the initially pinch-or-swaged formed hollow ball-preform 18. With the use of the said more sharply oriented, raised surface portion 23 in complementary engagement with a matching recess, as at 24, in the boss area 18b of the initially formed hollow ball-preform 18, an even more positive and directed control of the inventive plastic deformation required to fill either the end openings 12a and 12b, and/or 13a and 13b, respectively, of the inventive form of FIGS. 2 and 2a, and the small internal cavity a of the modification of FIG. 6, for example, is effected.

Thus, a new and improved hollow ball-fabrication technique has been developed by the present invention, wherein a seamless hollow ball structure has been formed that is capable of acting as a load carrying structural unit in a ball bearing or similar unit. Moreover, by producing the requisite hollow ball with a more homogeneous metallurgical structure throughout the wall thickness of the ball, and because of the inherent nature of the contact stress field involved, a much greater reliability exists than would be for a bonded or brazed joint. Moreover, the end result of the foregoing unique processing is to generate a hollow ball structure whose dynamic load/life capability in a rolling contact application will be determined solely by the basic characteristics of the material used for the ball structure per se.

We claim:

1. In a method for fabricating a seamless hollow ball for use in rolling contact bearings, the steps comprising; initially precutting a relatively short length of a metal tube of predetermined size and shape; positioning the precut tube in intermediate relation between, and in opposed contact with a first pair of oppositely disposed forging members, at least one of which being mounted for movement between inoperative and operative positions relative to said tube; thereafter forging the tube into an initially produced hollow ball-preform of substantially spherical or non-spherical shape, depending on the desired initial configuration intended to be formed, and incorporating an internal cavity, or a pair of diametral openings inherently formed therewithin, as a result of the forging thereof by the combined action against the tube of the said first pair of forging members including the movement of at least one thereof to its operative position; repositioning the initially produced hollow ball-preform between and in opposed contact with a second pair of pressure, forging members; applying localized heat to the area of the hollow ball-preform encompassing the internal cavity, or diametral openings; and subsequently actuating the second pair of forging members in opposed relation against, and thereby pressure or forge-welding the hollow ball-preform by plastically deforming and causing flow of the metal encompassed by the localized heat being applied to thereby simultaneously fill the void resulting from, and at the internal cavity, or diametral openings and/or progressively re-shape the initially produced hollow ball-preform into a final spherical configuration.

2. In a method for fabricating a seamless hollow ball as in claim 1, wherein the step of positioning the precut tube between the first pair of forging members includes the application of a mounting means for retaining said tube in stationary relation during its forging into a hollow ball-preform.

3. In a method for fabricating a seamless hollow ball as in claim 2, wherein said first pair of forging members each comprise a die member mounted for simultaneous rotation in opposite directions to each other and for concerted longitudinal movement inwardly along opposite ends of the precut tube and in direct alignment with the axis thereof.

4. In a method for fabricating a seamless hollow ball as in claim 3, wherein said precut tube is positioned with its opposite ends in contacting relation in a die cavity incorporated in each of said pair of die members for thereby being spin-forged into the hollow ball-preform.

5. In a method for fabricating a seamless hollow ball as in claim 4, wherein the spin-forged hollow ball-preform is formed into a non-spherical configuration-structure having oppositely disposed and equatorially oriented, outwardly extending boss areas encompassing the pair of diametral openings and having the localized heat applied thereto.

6. In a method for fabricating a seamless hollow ball as in claim 5, wherein the second pair of pressure, forging members comprise an anvil member, and a die member oriented in opposed relation to each other, and in direct alignment and in contact with the oppositely disposed boss areas.

7. In a method for fabricating a seamless hollow ball as in claim 6, wherein each of said boss areas incorporates a raised and straight surface portion of limited extent and projecting outwardly therefrom, and each of said anvil and die members include a similarly raised and straight inwardly extending surface portion of limited extent that matches and is in respective contact with that of each boss area to thereby concentrate, direct and thus provide a controlled plastic deformation resulting during and consisting of the pressure or forge-welding step.

8. In a method for fabricating a seamless hollow ball as in claim 1, wherein the second step comprises positioning the precut tube with its axis oriented in transverse relation with the first pair of oppositely disposed forging members.

9. In a method for fabricating a seamless hollow ball as in claim 8, wherein the second step further comprises mounting the precut tube for rotation during the positioning between the first pair of forging members.

10. In a method for fabricating a seamless hollow ball as in claim 6, wherein each of said boss areas incorporates a well-defined and inwardly facing recess in alignment with, and spaced from the internal cavity, or diametral openings; and each of said anvil or die members incorporates an outwardly projecting protuberance portion extending inwardly in snug-fitting relation within each of the said hollow ball-preform recesses to thereby direct a more intensified, localized plastic deformation during the pressure or forge-welding step.

* * * * *